(No Model.)
G. H. PIGMAN.
SPRING SUPPORT FOR VEHICLE SHAFTS.
No. 390,137. Patented Sept. 25, 1888.
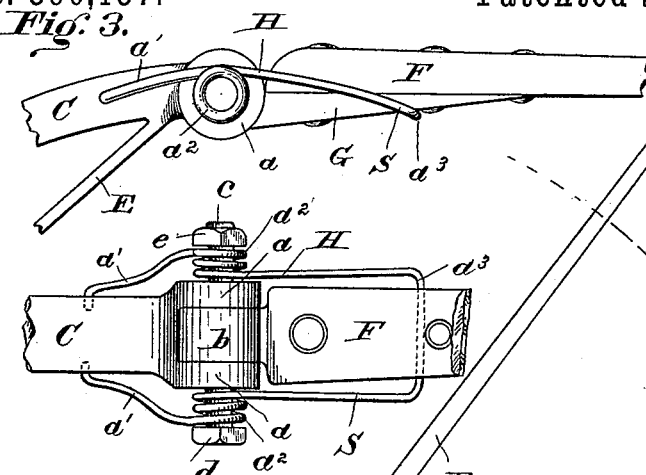
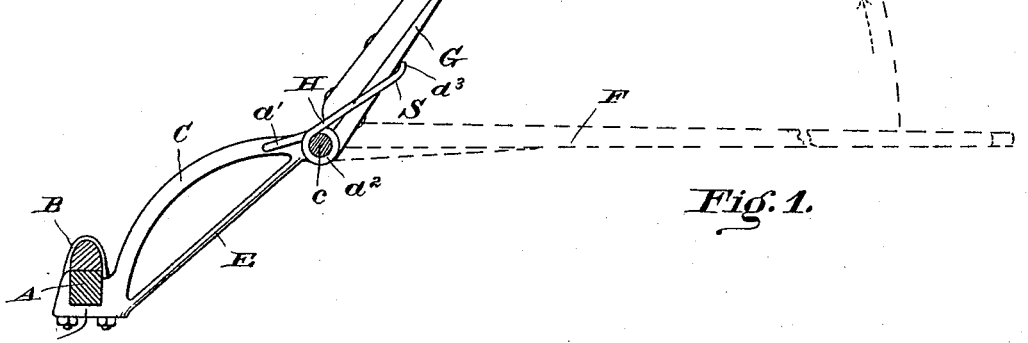
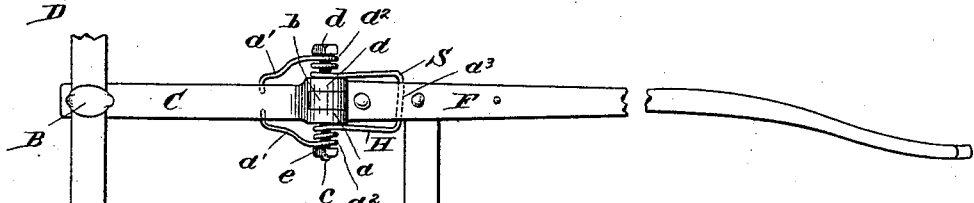
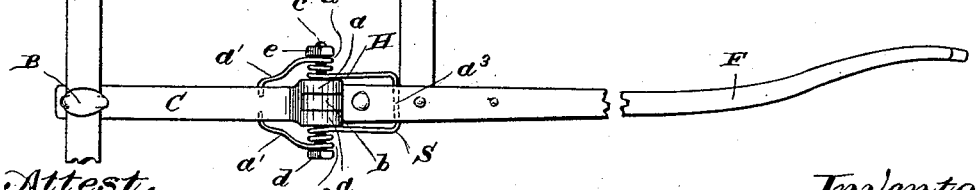
Attest.
C. W. Bogart,
J. S. Havens
Inventor.
George H. Pigman
per Frehli & Hill
Attys.

United States Patent Office.

GEORGE H. PIGMAN, OF READING, OHIO.

SPRING-SUPPORT FOR VEHICLE-SHAFTS.

SPECIFICATION forming part of Letters Patent No. 390,137, dated September 25, 1888.

Application filed January 11, 1888. Serial No. 260,442. (No model.)

*To all whom it may concern:*

Be it known that I, GEORGE H. PIGMAN, a resident of the town of Reading, in the county of Hamilton and State of Ohio, have invented certain new and useful Improvements in Devices for Supporting and Elevating Vehicle-Shafts, of which the following is a specification.

The object of my invention is to provide a device for automatically raising the shafts of vehicles after the horse is unhitched, and to keep them elevated while the vehicle is not in use. At present when the horse is unhitched the shafts are allowed to drop on the floor unless a prop is placed under them, which is very inconvenient, and in this way the shafts are often broken and the paint scratched off, and it is inconvenient to back the horse between them. The shafts in this manner also take up considerable room and are in the way. By the use of my device these objections are obviated, the shafts are automatically elevated when the horse is unhitched, and retained in an elevated position until it is desired to again use the vehicle.

My device is simple in construction and cheap of manufacture.

In the accompanying drawings, forming part of this specification, Figure 1 represents a side view of my device applied to the shafts, (the shafts being elevated,) the position of the shafts when in use being shown by dotted lines, the dotted lines and arrow also showing the path of the shafts when being elevated. Fig. 2 is a top view of my device applied to the shafts. Fig. 3 is a side view showing my device applied to the shafts, the shafts being in position for use, (the shafts being partly broken away.) Fig. 4 is an enlarged top view of my device, (the shafts being partly broken away.)

A represents the axle of the vehicle, and B the axle-clip.

I do not attach the shafts by a thill coupling, but attach them to auxiliary shafts C, which arch forward and upward from the axle, as shown in Fig. 1. The lower parts of these auxiliary shafts are shaped as shown in Fig. 1 at D, to receive the axle and brace it, stay-rods E being present to strengthen the auxiliary shafts. This auxiliary-shaft connection forms the subject for a separate application for Letters Patent, the serial number of which application is 260,443.

The auxiliary shafts C are bifurcated, terminating in two eyes, $a\ a$. The shafts F are somewhat shorter than the ordinary shafts, owing to the presence of the auxiliary shafts C. To the shaft-irons G, I usually attach in any suitable manner the eye $b$, preferably, however, making them in one piece. Through the eyes $a\ b$, I pass the bolt or pin $c$, having a head, $d$. This pin or bolt $c$ is screw-threaded at one end to receive the nut $e$. This bolt $c$, when passed through the eyes $a\ b$, pivotally connects the shafts F to the auxiliary shafts C.

H represents a spring, preferably formed as shown; but I may employ any other form of spring desired. The wire or other material which forms this spring H is first bent to form the loop or tongue S, and is then coiled (preferably nearest to the shafts) around the pin or bolt $c$ on each side of the eyes $a\ a$ as many times as is desired, three coils, $a^2$, being shown in this instance. The last coil of the spring is continued and extended backward and inward to form two arms, $a'\ a'$, which arms enter recesses in the sides of the auxiliary shaft C, as shown in dotted lines in Figs. 1 and 4; but they may be otherwise permanently attached. The head $d$ and nut $e$ keep the coils of the spring from coming off the pin $c$.

The spring-connection between the shafts and auxiliary shafts may be made in any other suitable manner and form, the one shown being preferable.

The end $a^3$ of the loop or tongue S passes under the shaft and supports the shaft. (See dotted lines, Figs. 2 and 4.) When desired, I may place a rubber roller on the end $a^3$ of the loop or tongue S.

When not in use, the shafts stand in the position shown in Fig. 1, and are held in that position by the spring H. When it is desired to hitch the horse, the shafts are pulled down, pressing the loop or tongue S of the spring down and being supported by it, as shown in Fig. 3. The device remains in this position until the horse is unhitched, and as soon as unhitched the shafts are automatically elevated by the spring H, the loop S pressing against the shafts and raising them.

The connection between the shafts and auxiliary shafts, as I have shown it, forms an "anti-rattler," as the tension of the spring keeps the parts from jostling and rattling and forms a somewhat flexible connection. One of the devices is placed on each shaft arm.

What I claim as new and of my invention, and desire to secure by Letters Patent, is—

1. In a shaft supporting and elevating device, the combination, with the ordinary shafts, of auxiliary shafts, a spring-connection, as H, between them, and connecting parts, substantially as set forth.

2. In a shaft supporting and elevating device, the combination of the ordinary shafts, F, auxiliary shafts C, bolt c, and spring H, having arms a' and tongue S, substantially as set forth.

3. In a shaft supporting and elevating device, the shafts F and auxiliary shafts C, eyes a and b, pin c, and spring H, coiled around said pin c, and having arms a' and tongue S, substantially as set forth.

4. In a shaft supporting and elevating device, the combination of shafts F, auxiliary shafts C, said shafts being pivotally connected, and a spring, as H, for automatically raising the shafts F, substantially as set forth.

GEORGE H. PIGMAN.

Witnesses:
WM. TUCKER,
W. T. HILL.